US008210496B2

(12) United States Patent
Chen

(10) Patent No.: US 8,210,496 B2
(45) Date of Patent: Jul. 3, 2012

(54) FUEL CAN ADAPTER

(75) Inventor: Jan-Nan Chen, Taichung (TW)

(73) Assignee: Pro-Iroda Industries, Inc., Taichung (TW)

( * ) Notice: Subject to any disclaimer, the term of this patent is extended or adjusted under 35 U.S.C. 154(b) by 383 days.

(21) Appl. No.: 12/610,453

(22) Filed: Nov. 2, 2009

(65) Prior Publication Data

US 2010/0143028 A1 Jun. 10, 2010

(30) Foreign Application Priority Data

Dec. 4, 2008 (TW) ............................... 97147163 A

(51) Int. Cl.
*F16K 51/00* (2006.01)

(52) U.S. Cl. ................ 251/144; 251/149.9; 137/614.05; 126/39 R

(58) Field of Classification Search .................. 251/142, 251/144, 149.1, 149.6, 149.9; 137/614.01, 137/614.05; 126/38, 39 R
See application file for complete search history.

(56) References Cited

U.S. PATENT DOCUMENTS

| | | | | | |
|---|---|---|---|---|---|
| RE28,334 | E | * | 2/1975 | Cranage | 137/360 |
| 4,009,729 | A | * | 3/1977 | Vik | 137/614.05 |
| 6,138,714 | A | * | 10/2000 | Kim | 137/614.05 |
| 6,202,982 | B1 | * | 3/2001 | Huguet et al. | 251/149.9 |
| 7,111,818 | B2 | * | 9/2006 | Takeda et al. | 251/144 |
| 7,900,887 | B2 | * | 3/2011 | Nayrac et al. | 251/149.9 |

* cited by examiner

*Primary Examiner* — John Fristoe, Jr.
(74) *Attorney, Agent, or Firm* — Alan Kamrath; Kamrath IP Lawfirm, PA

(57) ABSTRACT

A fuel can adapter has a threaded section for threadly engaging with a fuel device. Particularly, the fuel device has a threaded joint for engagement with the thread section of the fuel can adapter. In addition, this threaded joint can be used to connect a fuel can with a thread head, such that fuel in the fuel can can flow to the fuel device. With the fuel can adapter, a fuel can with a head, which does not have a threaded head but has a flange extending circumferentially thereon, is adapted to connect to the fuel device, such that fuel in the fuel can can flow to the fuel device.

13 Claims, 9 Drawing Sheets

FUEL CAN ADAPTER

BACKGROUND OF THE INVENTION

1. Field of the Invention

The present invention relates to a fuel can adapter.

2. Description of the Related Art

Fuel cans currently on the market have two kinds of heads. One kind is a head 301' that has an outer peripheral edge having a threaded section formed thereon, as shown in FIG. 9. To connect the fuel can 3' to a gas device 2, this head 301' is to be engaged with a threaded joint of the gas device 2. Another kind is a head that does not have a threaded section but has a flange extending circumferentially thereon. Consequently, the fuel can with this kind of head can not engage with the threaded joint of the gas device 2.

The present invention is, therefore, intended to obviate or at least alleviate the problems encountered in the prior art.

SUMMARY OF THE INVENTION

According to the present invention, a fuel can adapter has a threaded section for threadly engaging with a fuel device. Particularly, the fuel device has a cavity with a threaded wall and a needle disposed in the cavity. The fuel can adapter is adapted to enable connection of a fuel can with the fuel device. Particularly the fuel can has a reservoir for storing fuel and a head that has a flange, a slot spacing the proximal end and the distal end of the flange, a protuberance and a valve disposed in the protuberance.

The fuel can adapter includes a coupling member including a threaded section engagable with the threaded wall of the cavity. A first connecting member is insertably mounted in the coupling member and is rotatable therein. Additionally, the first connecting member includes a passage extending therethrough. The fuel can adapter further includes a locking member rotatable with respect to the first connecting member. The locking member includes a locking block insertable in the slot and a slit provided on the locking block and adapted to allow the proximal end of the flange to engage therein. Also, the fuel can adapter includes a second connecting member connected to the first connecting member and rotatable with the first connecting member. The second connecting member includes a hole defining a first compartment and a second compartment and extending therethrough. The first compartment is adapted to receive the protuberance, and the second compartment is adapted to receive the valve. In addition, the locking member is rotatable between an unlocked position and a locked position with the slit receiving the proximal end of the flange, thereby locking the fuel can.

When in use, the coupling member is threadly engaged in the cavity, the needle includes an end received in one open end of the passage, the protuberance is received in the first compartment, the valve is received in the second compartment, and the locking member is rotated to the locked position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

For the present disclosure to be easily understood and readily practiced, the present disclosure will now be described in conjunction with the following figures, wherein.

DETAILED DESCRIPTION OF THE PREFERRED EMBODIMENT

Figure 1:
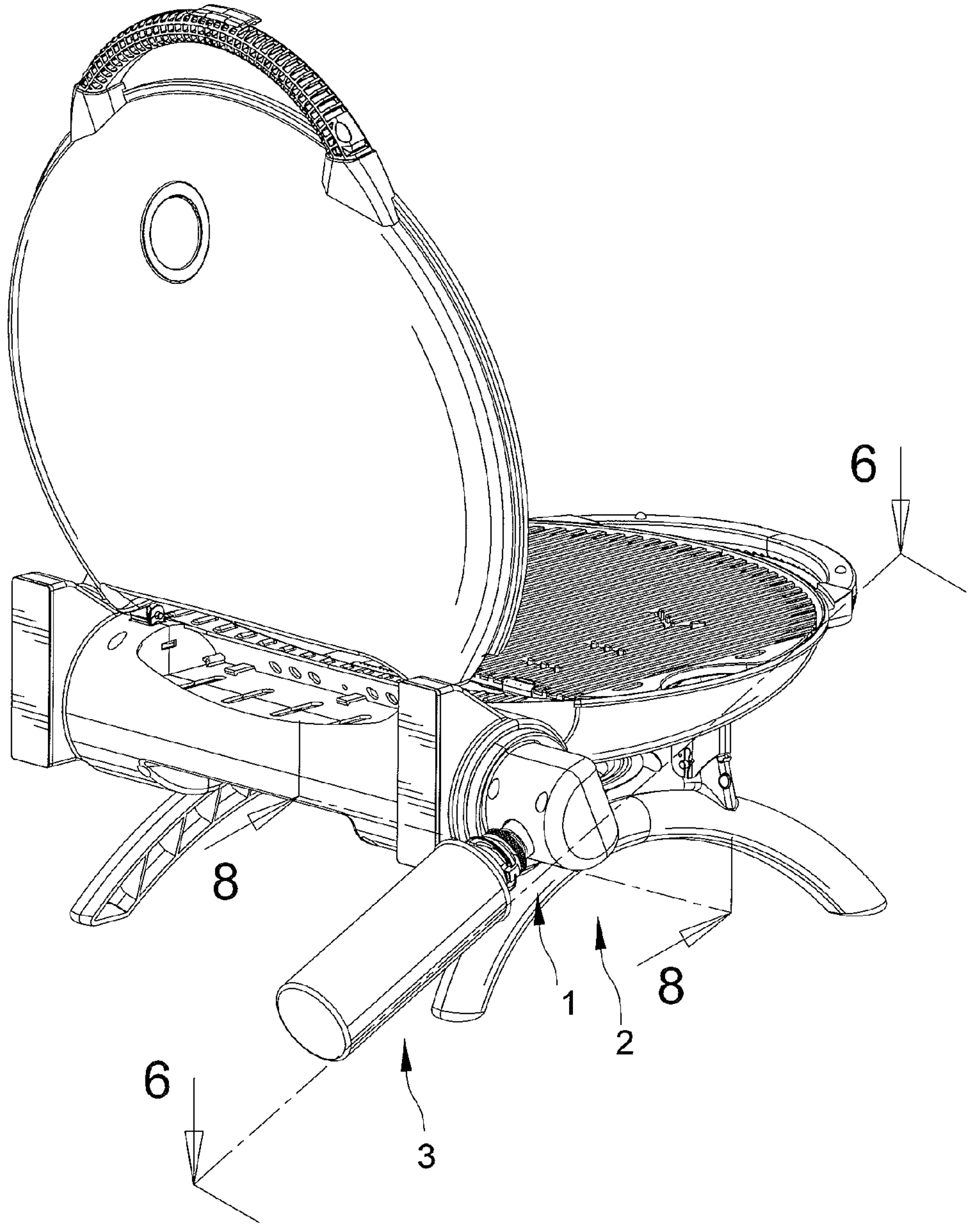
FIG. 1 is a perspective view of a fuel can adapter in accordance with the present invention connecting a fuel can to a fuel device.
Figure 2:
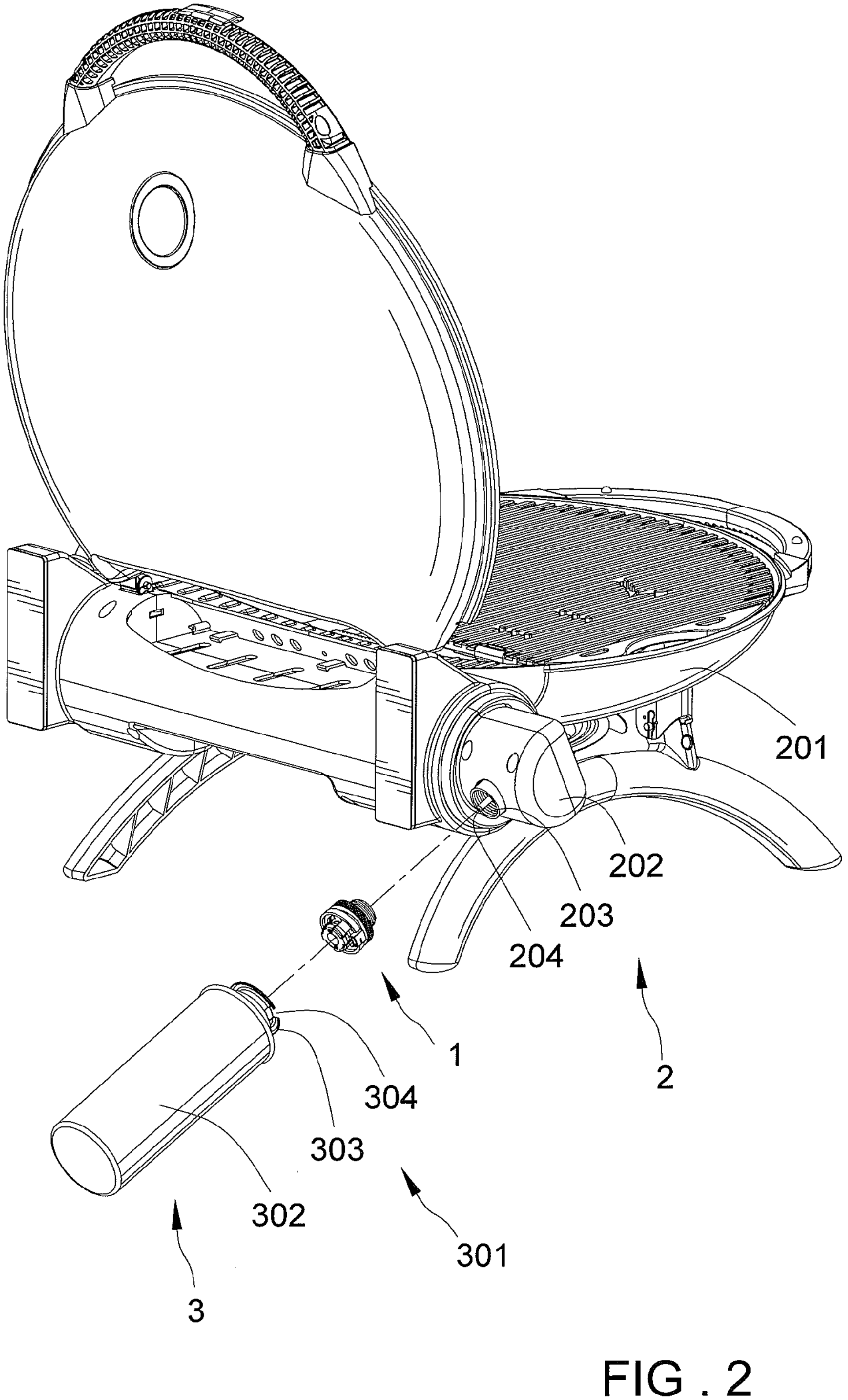
FIG. 2 is an illustrative view showing installation of the fuel can on the fuel device via the fuel can adapter.
Figure 3:
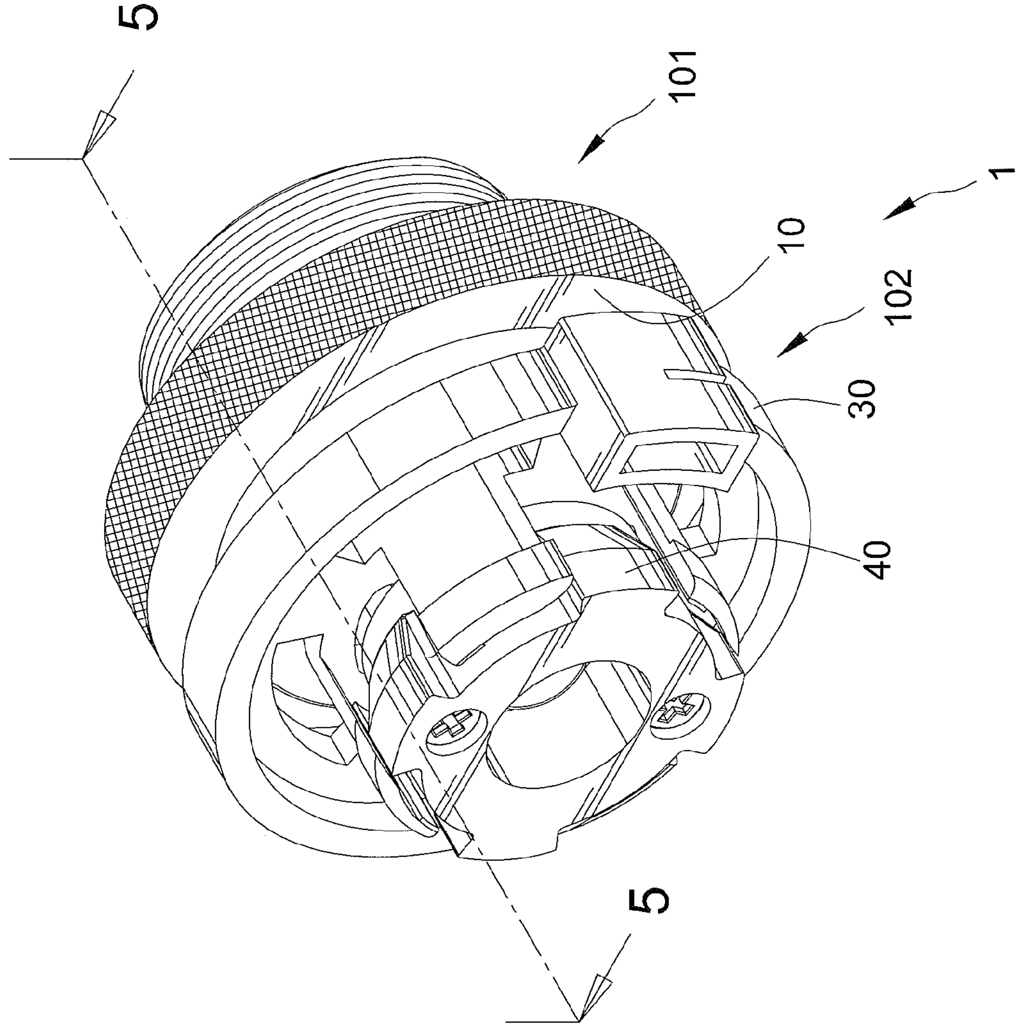
FIG. 3 is a perspective view of the fuel can adapter shown in FIG. 1.
Figure 4:
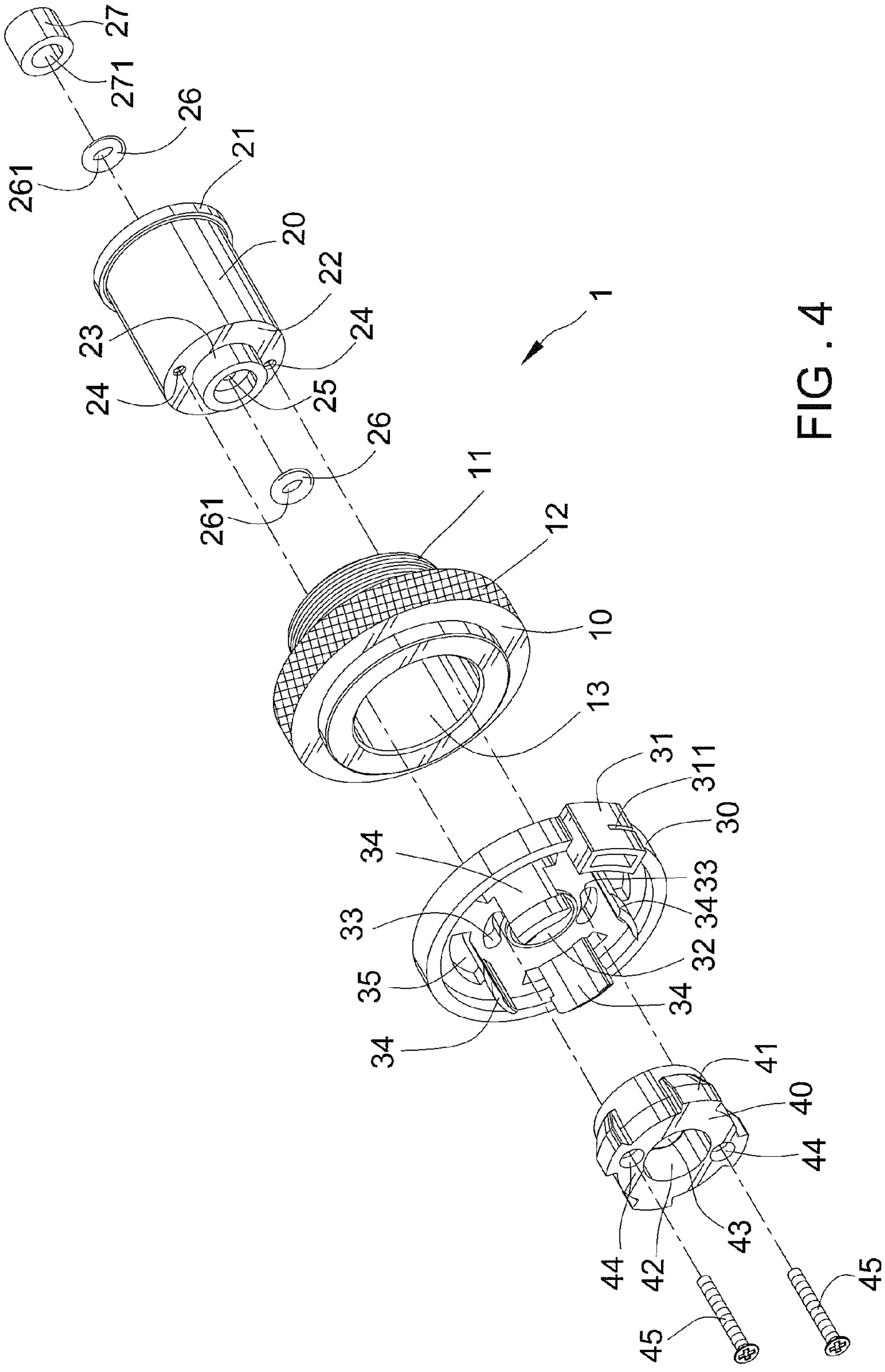
FIG. 4 is an exploded perspective view of the fuel can adapter shown in FIG. 1.
Figure 5:
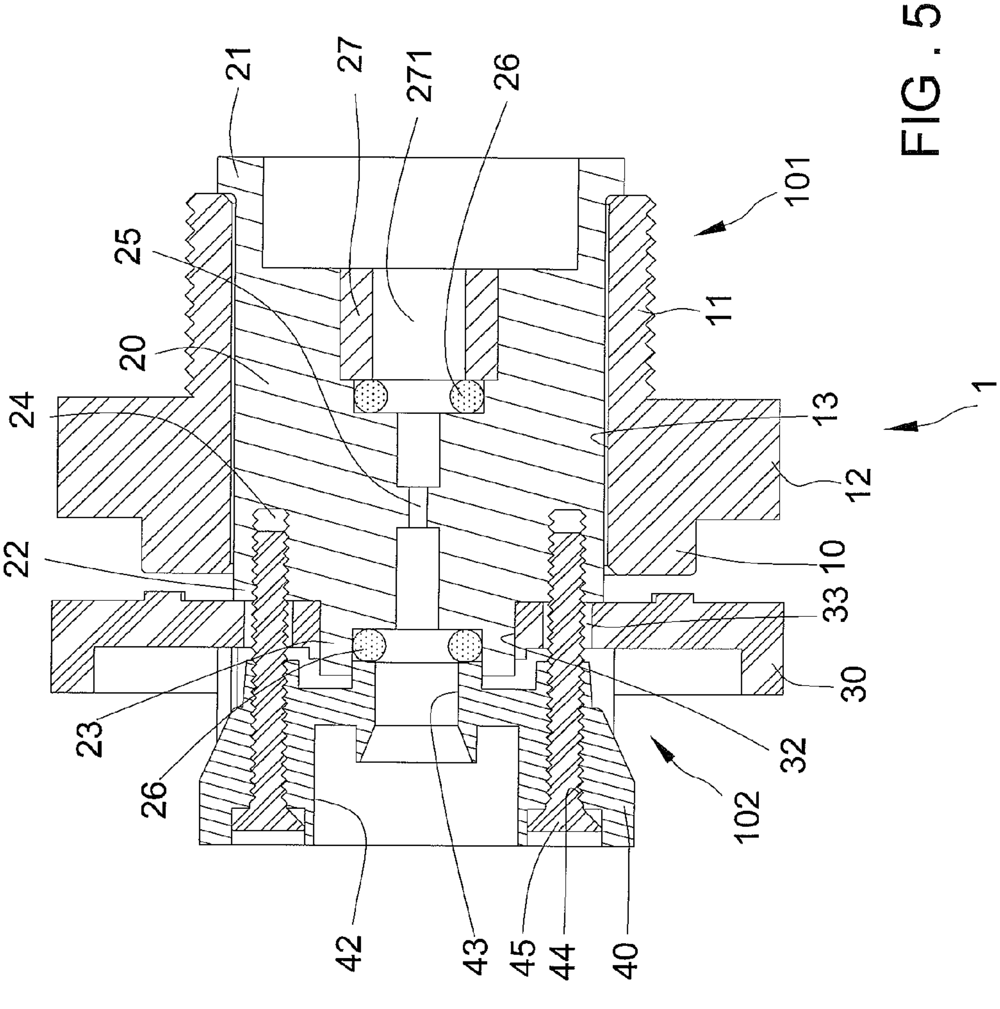
FIG. 5 is a cross-sectional view taken along line 5-5 of FIG. 3.
Figure 6:
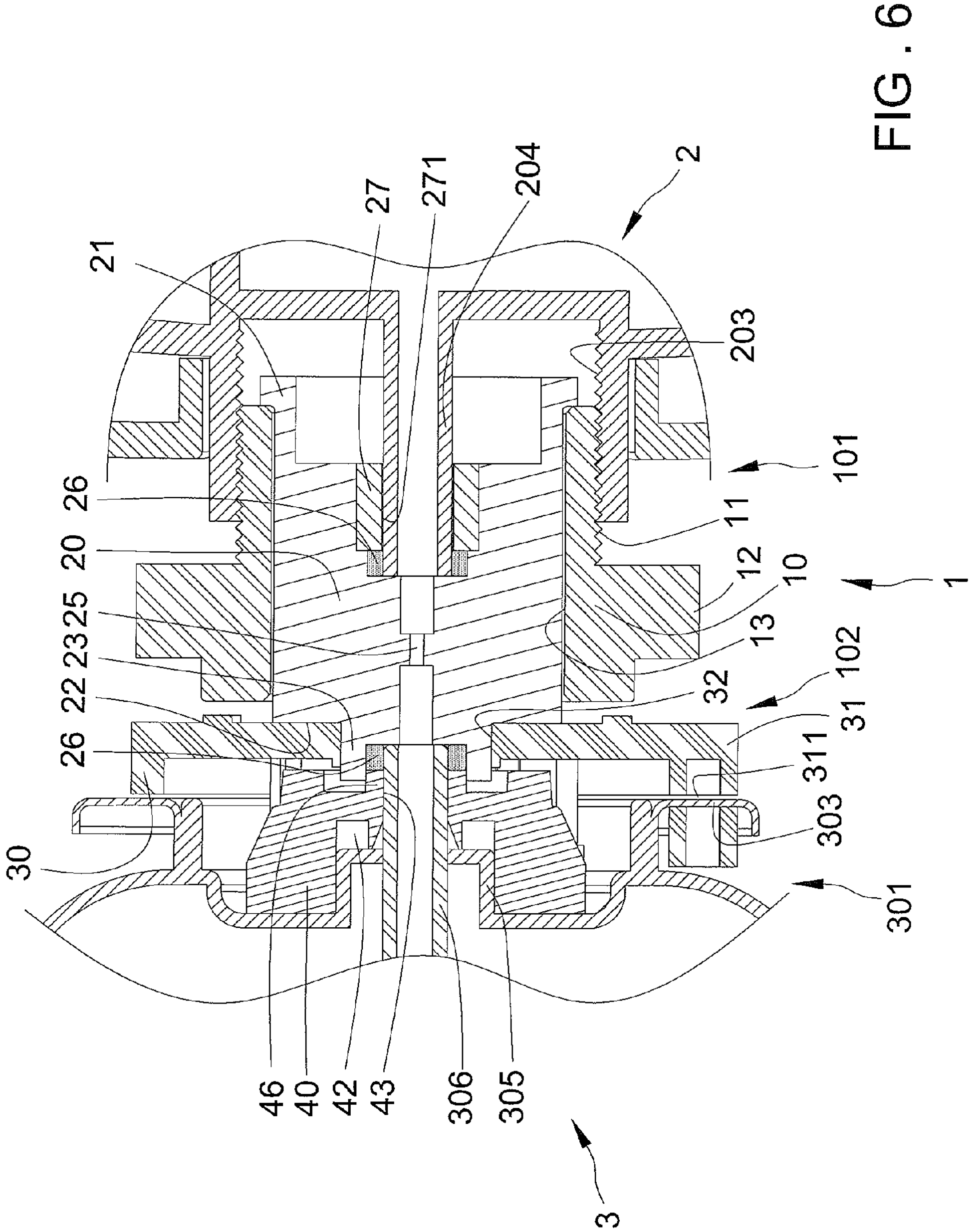
FIG. 6 is a cross-sectional view taken along line 6-6 of FIG. 1.

Referring to the drawings, a fuel can adapter 1 in accordance with the present invention includes a first end 101 and a second end 102 and is adapted to enable connection of a fuel device 2, for example a barbecue stove as illustrated, and a fuel can 3 at the first and second ends 101 and 102, respectively. Particularly, the fuel device 2 has a body 201 with a fuel can connecting section 202 having a cavity 203 with a threaded wall and a needle 204 disposed in the cavity 203. The fuel can 3 has a reservoir 302 for storing fuel and a head 301 having a flange 303, a slot 304 spacing the proximal end and the distal end of the flange 303, a protuberance 305 and a valve 306 disposed in the protuberance 305. The flange 303 extends circumferentially on the head 301 and in a plane transverse to a longitudinal length of the fuel can 3.

The fuel can adapter 1 includes a coupling member 10 for threadly engaging it to the fuel device 2. The coupling member 10 includes an outer peripheral edge having a threaded section 11 formed annularly thereon. The threaded section 11 is to be engaged with the threaded wall of the cavity 203 when the fuel can adapter 1 is connected to the fuel device 2. Also, the coupling member 10 includes a gripping section 12, which is adapted to facilitate the user to thread the fuel can adapter 1, formed annularly on the outer peripheral edge. The gripping section 12 may be provided with a grid pattern, thereby preventing the user from slippage when threading the fuel can adapter 1. In addition, the coupling member 10 includes a hole 13 extending therethrough, and the coupling member 10 includes an inner peripheral edge delimiting the hole 13.

The fuel can adapter 1 further includes a first connecting member 20 insertable and rotatable in the hole 13. The first connecting member 20 includes an outer peripheral edge disposed in hole 13 except for a ridge 21 and a supporting section 23. The ridge 21 is formed annularly thereon and at one end thereof and is limited outside the hole 13, since the ridge 21 has a diametrical size larger than a diametrical size of the hole 13. The supporting section 23 is formed at the other end thereof and is utilized to support a locking member 30 of the fuel can adapter 1 (as will be described in detail thereafter). Moreover, the outer peripheral edge includes an abutting section 22 against which the locking member 30 abuts. The first connecting member 20 further includes two orifices 24 extending from its outer peripheral edge, particularly the abutting section 22. Each orifice 24 is radially spaced with respect to the supporting section 23 with the same distance. In addition, the first connecting member 20 includes a passage 25 extending therethrough, and the first connecting member 20 includes an inner peripheral edge delimiting the passage 25. In the embodiment, the passage 25 is with a stepped configuration. Thus, the passage 25 (or the inner peripheral edge of the first connecting member 20) has variable cross-sectional areas. Further, the passage 25 has one of its open ends in which an end of the needle 204 of the fuel device 2 is insertable until it is stopped by the inner peripheral edge of the first connecting member 20. Moreover, the needle 204 would insert through a seal 26 via an aperture 261 and a clip ring 27 via an aperture 271, which are disposed in the passage 25. The seal 26 is provided for preventing a gas leak between the needle 204 and the passage 25. The clip ring 27 is provided for retaining the needle 204 in the passage 25 securely.

The locking member 30 is rotatable with respect to the first connecting member 20. Also, the locking member 30 includes two opposing sides and a hole 32 extending through the sides and inserted by the supporting section 23 of the first connecting member 20 to support the locking member 30 on the first connecting member 20. Moreover, one of the sides abuts against the abutting section 22 of the first connecting member 20. The locking member 30 further includes two channels 33 extending through the opposing sides. Each channel 33 is radially spaced with respect to the hole 32 with the same distance. In addition, the locking member 30 includes a circumferential edge, which encompasses two opposing sides, including a locking block 31 made from the same. The locking block 31 is insertable in the slot 304 of the fuel can 3. Additionally, the locking block 31 includes a slit 311 adapted to allow the proximal end of the flange 303 of the fuel can 3 to engage therein, thereby locking the fuel can 3. In addition, the locking member 30 includes a plurality of lugs 34 extending from the other of the opposing sides. Each lug 34 extends substantially transversely to the side and is radially spaced with respect to the hole 32 with the same distance. Further, each lug 34 includes a blunt proximal end 341 and a tapered distal end 342. In addition, the locking member 30 includes a plurality of voids 35 extending through the opposing sides to save material.

The fuel can adapter 1 further includes a second connecting member 40 connected to the first connecting member 20 and rotatable with the first connecting member 20. Likewise, the locking member 30 is rotatable with respect to the second connecting member 40. The second connecting member 40 includes an outer peripheral edge having a plurality of protrusions 41 formed thereon and spaced from one another, and one lug 34 of the locking member 30 is adapted to be disposed between a space defined by a pair of protrusions 41. Also, the second connecting member 40 includes a hole defining a first compartment 42 and a second compartment 43 and extending therethrough, and the second connecting member 40 includes an outer peripheral edge delimiting the first and second compartments 42 and 43. Moreover, the second connecting member 40 includes an end forming an engaging section 46 that includes an inner periphery delimiting the second compartment 43. The engaging section 46 is partially receivable in the other open end of the passage 25 and would abut against another seal 26 disposed in the passage 25. In addition, the fuel can 3 is connectable to the fuel can adapter 1 by engaging the protuberance 305 in the first compartment 42 and the end of the valve 306 in the second compartment 43. The end of the valve 306 would insert through the seal 26, and the seal 26 prevents a gas leak between the valve 306 and the passage 25. The second connecting member 40 further includes two orifices 44 extending therethrough and radially spaced with respect to the first compartment 42 with the same distance. Each orifice 44 is disposed corresponding to one channel 33 of the locking member 30 and one orifice 24 of the first connecting member 20. Further, a fastener 45 is inserted through one orifice 44 and one channel 33 and engaged in one orifice 24 to secure the second connecting member 40 and the locking member 30 with the first connecting member 20 and prevent disengagement therefrom.

Figure 7:
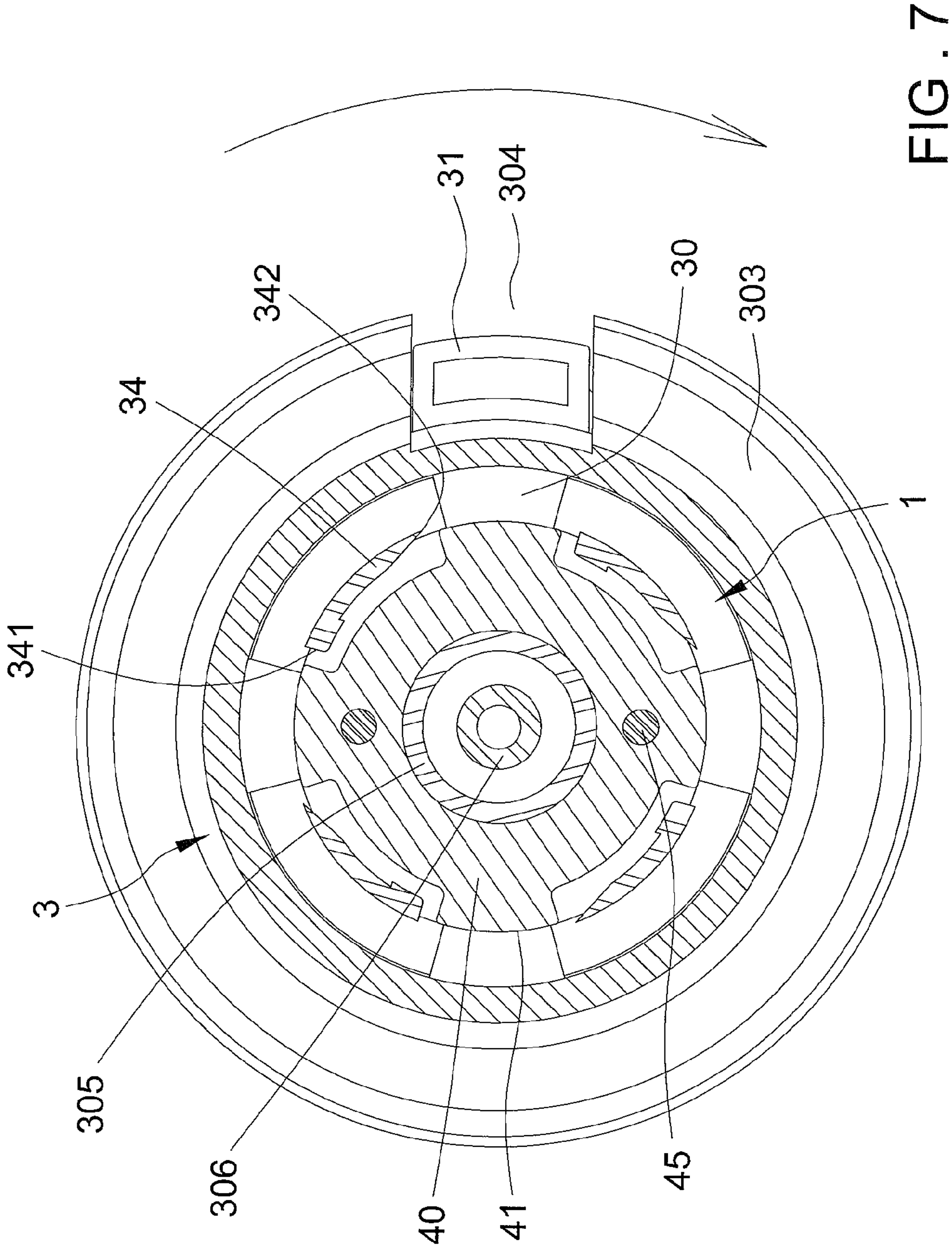
FIG. 7 is a cross-sectional view showing the fuel can adapter in an unlocked position with respect to the fuel can.
Figure 8:
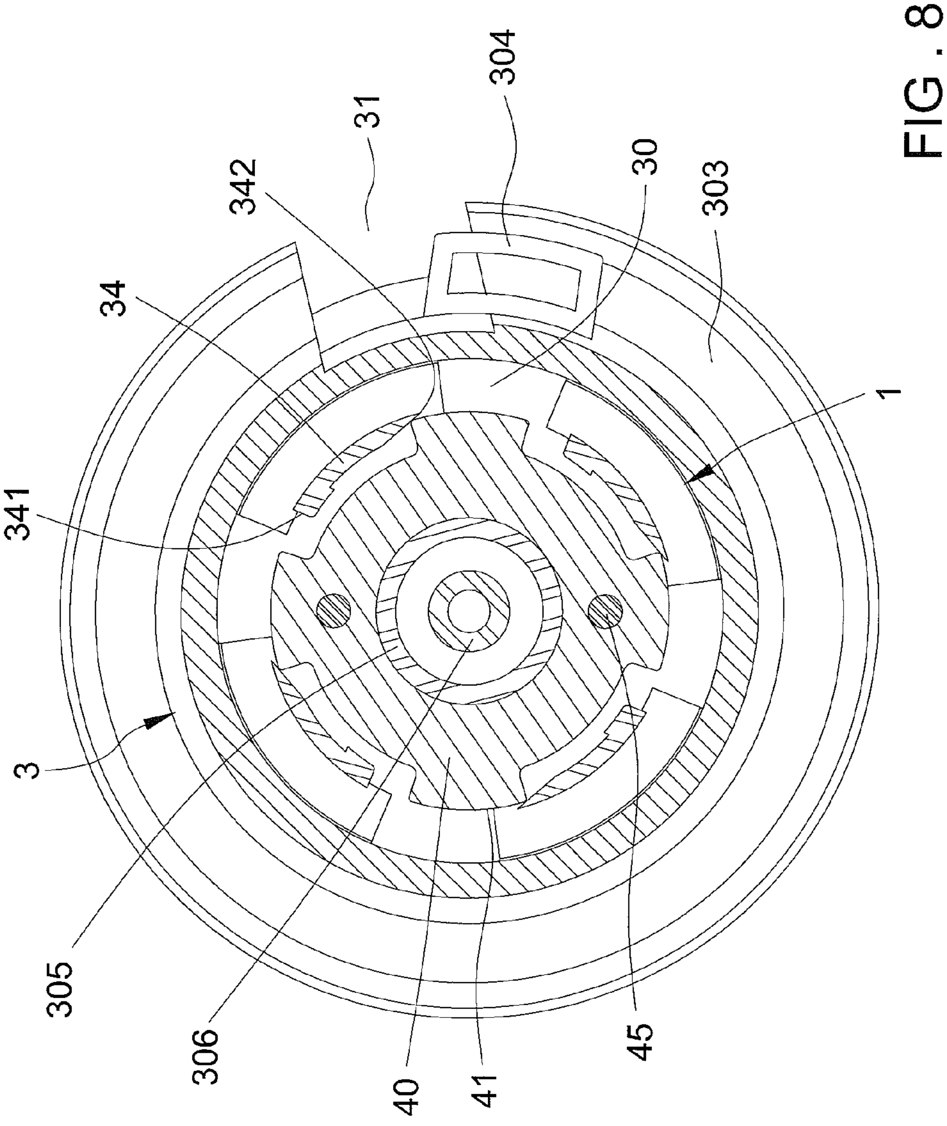
FIG. 8 is a cross-sectional view taken along line 8-8 of FIG. 1 and shows the fuel can adapter in a locked position with respect to the fuel can.
Figure 9:
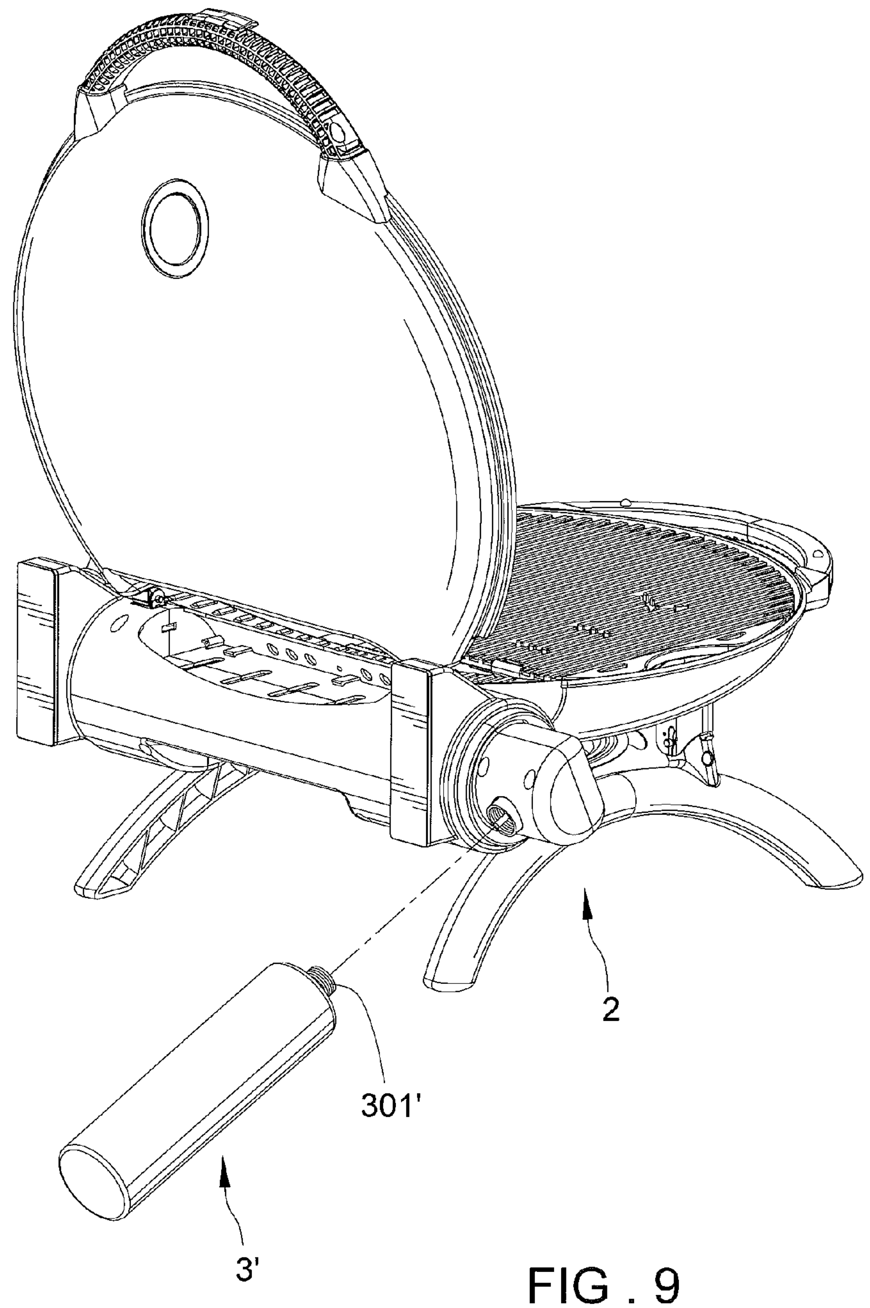
FIG. 9 PRIOR ART
FIG. 9 is an illustrative view showing a conventional fuel can with a threaded head can installed on the fuel device shown in FIGS. 1 and 2.

Referring to FIGS. 7 and 8, in order to prevent the fuel can 3 from dislodging from the fuel can adapter 1, the locking member 30 is rotated with respect to the second connecting member 40 from an unlocked position (FIG. 7) to a locked position with the slit 311 engaging therein the proximal end of the flange 303 of the fuel can 3, thereby locking the fuel can 3. When the locking member 30 is rotated, the tapered distal end 342 of each lug 34 is adapted to go atop of one protrusion 41, and this tapered structure would facilitate climbing.

Further, fuel in the reservoir 302 of the fuel can 3 can flow through the valve 306, the passage 25, and the needle 204 of the fuel device 2, thereby allowing the fuel device 2 to use fuel.

In addition, the fastener 45 is moveable in the channel between first and second positions when the locking member 30 is rotatable between the unlocked and locked positions.

While the specific embodiments have been illustrated and described, numerous modifications come to mind without significantly departing from the spirit of invention, and the scope of invention is only limited by the scope of the accompanying claims.

What is claimed is:

1. A fuel can adapter adapted to enable connection of a fuel device and a fuel can, with the fuel device including a fuel can connecting section having a cavity with a threaded wall and a needle disposed in the cavity, and with the fuel can including a reservoir for storing fuel and a head having a flange, a protuberance, a slot spacing a proximal end and a distal end of the flange, and a valve disposed in the protuberance, comprising:

a coupling member including a threaded section engagable with the threaded wall of the cavity;

a first connecting member insertably mounted in the coupling member and rotatable therein, with the first connecting member including a passage extending therethrough, with the needle including an end received in one open end of the passage;

a locking member rotatable with respect to the first connecting member, with the locking member including a locking block insertable in the slot, with a slit provided on the locking block and adapted to allow the proximal end of the flange to engage therein;

a second connecting member connected to the first connecting member and rotatable with the first connecting member, with the second connecting member including a hole defining a first compartment and a second compartment and extending therethrough, and with the first compartment adapted to receive the protuberance and the second compartment adapted to receive the valve; and wherein the locking member is rotatable between an unlocked position and a locked position with the slit receiving the proximal end of the flange, thereby locking the fuel can;

wherein the coupling member includes a hole extending therethrough, wherein the coupling member includes an inner peripheral edge delimiting the hole;

wherein the first connecting member includes an outer peripheral edge defining a ridge and a supporting section, with the outer peripheral edge disposed in the hole except for the ridge and the supporting section; and wherein the locking member includes two opposing sides and a hole extending through the two opposing sides and inserted by the supporting section to support the locking member.

2. The fuel can adapter as claimed in claim 1 wherein the coupling member includes an outer peripheral edge, and with the threaded section formed annularly thereon, and wherein the coupling member includes a gripping section, which is adapted to facilitate a user to thread the fuel can adapter, formed annularly on the outer peripheral edge.

3. The fuel can adapter as claimed in claim 1 wherein the locking member includes a plurality of lugs extending from the one of the two opposing sides, and wherein the second connecting member includes an outer peripheral edge having a plurality of protrusions formed thereon and spaced from one another, and wherein one lug of the plurality of lugs is adapted to be disposed between a space defined by a pair of the plurality of protrusions.

4. The fuel can adapter as claimed in claim 3 wherein each lug includes a blunt proximal end and a tapered distal end, and wherein the tapered distal end of each lug is adapted to go atop of one of the plurality of protrusions upon rotation of the locking member.

5. The fuel can adapter as claimed in claim 1 wherein the outer peripheral edge of the first connecting member includes an abutting section against which the locking member abuts, and wherein the locking member includes a channel extending through the two opposing sides, and wherein the second connecting member includes a second orifice extending therethrough, and wherein the first orifice, the channel and the second orifice are disposed corresponding to one another.

6. The fuel can adapter as claimed in claim 5 further comprising a fastener inserting through the second orifice and the channel and engaging in the first orifice to secure the second connecting member and the locking member with the first connecting member.

7. The fuel can adapter as claimed in claim 6 wherein the fastener is moveable in the channel between first and second positions when the locking member is rotatable between the unlocked and locked positions.

8. A fuel can adapter adapted to enable connection of a fuel device and a fuel can with the fuel device including a fuel can connecting section having a cavity with a threaded wall and a needle disposed in the cavity, and with the fuel can including a reservoir for storing fuel and a head having a flange, a protuberance, a slot spacing a proximal end and a distal end of the flange, and a valve disposed in the protuberance, comprising:

a coupling member including a threaded section engagable with the threaded wall of the cavity;

a first connecting member insertably mounted in the coupling member and rotatable therein, with the first connecting member including a passage extending therethrough, with the needle including an end received in one open end of the passage;

a locking member rotatable with respect to the first connecting member, with the locking member including a locking block insertable in the slot, with a slit provided on the locking block and adapted to allow the proximal end of the flange to engage therein;

a second connecting member connected to the first connecting member and rotatable with the first connecting member, with the second connecting member including a hole defining a first compartment and a second compartment and extending therethrough, and with the first compartment adapted to receive the protuberance and the second compartment adapted to receive the valve; and wherein the locking member is rotatable between an unlocked position and a locked position with the slit receiving the proximal end of the flange, thereby locking the fuel can;

wherein the coupling member includes a hole extending therethrough, wherein the coupling member includes an inner peripheral edge delimiting the hole;

wherein the first connecting member includes an outer peripheral edge defining a ridge and a supporting section, with the outer peripheral edge disposed in the hole except for the ridge and the supporting section;

wherein the ridge is formed annularly thereon and has a diametrical size larger than a diametrical size of the hole such that the ridge is limited outside the hole.

9. The fuel can adapter as claimed in claim 8 wherein the coupling member includes an outer peripheral edge, and with the threaded section formed annularly thereon, and wherein the coupling member includes a gripping section, which is adapted to facilitate a user to thread the fuel can adapter, formed annularly on the outer peripheral edge.

10. A fuel can adapter adapted to enable connection of a fuel device and a fuel can, with the fuel device including a fuel can connecting section having a cavity with a threaded wall and a needle disposed in the cavity, and with the fuel can including a reservoir for storing fuel and a head having a flange, a protuberance, a slot spacing a proximal end and a distal end of the flange, and a valve disposed in the protuberance comprising:

a coupling member including a threaded section engagable with the threaded wall of the cavity;

a first connecting member insertable mounted in the coupling member and rotatable therein, with the first connecting member including a passage extending therethrough, with the needle including an end received in one open end of the passage;

a locking member rotatable with respect to the first connecting member, with the locking member including a locking block insertable in the slot, with a slit provided on the locking block and adapted to allow the proximal end of the flange to engage therein;

a second connecting member connected to the first connecting member and rotatable with the first connecting member, with the second connecting member including a hole defining a first compartment and a second compartment and extending therethrough, and with the first compartment adapted to receive the protuberance and the second compartment adapted to receive the valve;

wherein the locking member is rotatable between an unlocked position and a locked position with the slit receiving the proximal end of the flange, thereby locking the fuel can; and first and second seals and a clip ring disposed in the passage, with the first seal and the clip ring enabling the needle to insert therethrough, with the first seal preventing a gas leak between the needle and the passage, with the clip ring retaining the needle in the passage securely, and with the second seal preventing a gas leak between the valve and the passage.

11. The fuel can adapter as claimed in claim 10 wherein the coupling member includes a hole extending therethrough, and wherein the coupling member includes an inner peripheral edge delimiting the hole.

12. The fuel can adapter as claimed in claim 11 wherein the first connecting member includes an outer peripheral edge defining a ridge and a supporting section, and with the outer peripheral edge disposed in the hole except for the ridge and the supporting section.

13. The fuel can adapter as claimed in claim 10 wherein the coupling member includes an outer peripheral edge, and with the threaded section formed annularly thereon, and wherein the coupling member includes a gripping section, which is adapted to facilitate a user to thread the fuel can adapter, formed annularly on the outer peripheral edge.

* * * * *